Patented Dec. 22, 1942

2,306,261

UNITED STATES PATENT OFFICE 2,306,261

CATALYTIC CONVERSIONS AND CATALYSTS THEREFOR

Chester C. Crawford, El Cerrito, and William E. Ross, Berkeley, Calif., assignors to Shell Development Company, San Francisco, Calif., a corporation of Delaware No Drawing. Application November 25, 1941, Serial No. 420,348

17 Claims. (Cl. 196—10)

This invention relates to the execution of catalytic conversions characterized by the use of new and improved catalysts of the Friedel-Crafts type.

An object of the invention is to provide new and improved catalysts of the Friedel-Crafts type which may be used with advantage in various conversions susceptible to catalyzation by catalysts of this type and which are particularly advantageous for effecting the isomerization of unsaturated hydrocarbons and various alkylation reactions. A further object of the invention is to provide an improved method for effecting these latter types of conversions, particularly the isomerization of straight run gasoline fractions and the alkylation of paraffins with olefins.

It is well known that the aluminum halides, such in particular as aluminum chloride and aluminum bromide, exert a strong catalytic influence on a wide variety of organic reactions. Aluminum chloride, for example, is one of the most active catalysts known for such reactions as the cracking of hydrocarbons, the polymerization of olefins, the isomerization of hydrocarbons, the alkylation of paraffin and/or aromatic hydrocarbons with olefins and/or cycloparaffins, condensations of the Friedel-Crafts type, and the like. In the application of these catalysts in these various processes, certain inherent disadvantages are encountered. One of these is the considerable tendency for the catalyst to react with various impurities in the reactants and/or side reaction products to form sticky sludges of a low order of activity. Another is the tendency for the catalyst to agglomerate in sticky lumps which cling to the reactor walls, paddles, etc., causing both a waste of catalyst as well as poor contact. Still another is the tendency of these catalysts when employed at elevated temperatures to volatilize and pass by entrainment into various parts of the plant where they condense and cause difficulties.

It has been recognized for some time that in order to overcome these disadvantages, at least in part, it would be desirable to employ these catalysts in the form of a liquid. With this in mind, it has been proposed at various times to employ these catalysts in the form of certain complex addition compounds. It is known that aluminum chloride and analogous compounds react with a variety of organic compounds to form complex addition compounds, usually of ill-defined composition, which are liquid at normal temperatures. Thus, for example, aluminum chloride reacts by addition with aromatic hydrocarbons, open chain olefins, diolefins, ethers and the like to form liquid products. Although some of these complexes, such in particular as those formed from aromatic hydrocarbons (the Gustavson compounds), have been found to be catalytically active, they have not come into general use, except possibly for a few easily effected conversions, due to their relatively low order of activity and more particularly to their lack of stability. The complex compounds hitherto tried are relatively unstable and are soon converted into viscous inactive sludges. This appears to be due largely to a more deep-seated reaction of the organic constituents of the complex with the aluminum halide.

We have now discovered that aluminum halides, such in particular as aluminum chloride and aluminum bromide, react with cyclic olefins to form liquid complex addition compounds which are unexpectedly quite different from those produced from open chain olefins and are superior to the various liquid complexes hitherto employed. The liquid complex addition compounds formed from aluminum halides and cyclic olefins, unlike those formed from open chain olefins and aromatic hydrocarbons, are relatively stable and exhibit better catalytic activity. It is also considered of great importance that the excellent catalytic activity of these complex compounds is very selective. Thus, by the application of these complex compounds, excellent conversions may be obtained while degradation reactions practically do not take place, whereas when using other types of complexes the conversions are either much lower or considerable side reaction products are formed. The substantial absence of degradation reactions when employing these cyclic olefin complexes is believed to be a factor contributing towards their greater stability. These superior characteristics of the cyclic olefin complex catalysts are illustrated and discussed more fully below with reference to the examples.

The cyclic olefin complex catalysts may be prepared by reacting an aluminum halide, such as aluminum chloride and/or aluminum bromide with a cyclic olefin. The reaction takes place readily. One suitable method of preparation is, for instance, to mix the aluminum halide and cyclic olefin and gently heat the mixture at about 80° C.–110° C., preferably while stirring. The complex formed separates as an oily lower layer which may be readily recovered by decantation. While it is not essential, the reaction is preferably effected in the presence of an added hydrogen halide, for instance, while bubbling hydrogen chloride into the reaction mixture. The use of a hydrogen halide in the preparation facilitates the interaction and generally gives catalysts of somewhat superior initial activity.

The catalyst may be prepared with any of the cyclic olefins. A preferred group of available cyclic olefins is, however, the mononuclear (monocyclic) olefins, such in particular as cyclohexene, cyclopentene, and their alkyl derivatives. These available cyclic olefins may be employed either singly or as mixtures. The cyclic olefin employed may, moreover, be reacted in the presence of an inert diluent such, for example, as cycloparaffins, open chain paraffins, and the like. Such diluents take no part in the reaction, and may be easily separated from the oily complex by decantation.

In preparing the cyclic olefin complex, the aluminum halide or other cyclic olefin may be employed in excess. In such cases where the cyclic olefin is employed in excess the unreacted cyclic olefin may be separated from the oily complex along with any diluents present by simple decantation. In such cases where the aluminum halide is employed in excess the oily complex will contain a certain amount of free aluminum halide. As will be more fully explained below, the free aluminum halide is in no way detrimental and does not need to be removed. The cyclic olefin complexes when prepared as above described (and in the absence of free aluminum halide) are found to contain about 1 to 2.5 mols of cyclic olefin to each mol of aluminum chloride ($AlCl_3$). They therefore conform to the general formula $AlHal_3R_n$ wherein Hal represents an atom of halogen such as chlorine or bromine, R represents a molecule of a cyclic olefin and $n$ is a positive number ranging from about 1 to about 2.5.

The above-described cyclic olefin complexes possess excellent catalytic activity and are capable of catalyzing such difficult reactions as the isomerization of paraffin hydrocarbons at practical rates even at relatively low temperatures. As will be seen from the examples they are capable of giving excellent conversion of isoparaffins at temperatures where the corresponding aromatic complexes are completely inactive. An important characteristic of these cyclic olefin complexes is, moreover, that they retain their same order of activity and their pronounced selectivity even in the presence of free aluminum halide. Other complex catalysts, such as the corresponding aromatic complexes, may be made as active as the present cyclic olefin complexes by dispersing free aluminum halide in them. In the case of these other complex catalysts, however, this causes the catalyst to take on more the characteristics of the free aluminum halide, presumably due to the free alminum halide acting as the true catalyst and the complex serving merely as a medium. When free aluminum halide is dispersed in these other complexes, the result is therefore that the selectivity of the catalyst is destroyed, appreciable degradation sets in, and the catalytic activity rapidly declines. In the case of the cyclic olefin complexes on the other hand, the presence of deliberate additives of free aluminum halide does not appreciably alter either the activity or the selectivity of the catalyst. The reason for this characteristic of the present complexes is not known. It is believed, however, that it is due to certain solvent characteristics of the complex which enable it to dissolve, disperse, or otherwise render ineffective the small amounts of sludges which are invariably formed in the reaction and which appear to promote degradation. In view of the above-described characteristics of the cyclic olefin complexes, any free aluminum halide left in suspension due to the use of an excess aluminum halide in the preparation of the complexes does not need to be removed. In fact, such suspended free aluminum halide is of distinct advantage, and in the preferred use of these catalysts an appreciable amount of free aluminum halide is deliberately dispersed in the complex. This free aluminum halide materially increases the practical life of the catalyst.

The above-described cyclic olefin complexes exhibit much the same catalytic activity as free aluminum halide catalysts, except that they are notably more selective in their action, even when containing free aluminum halide in suspension. They may therefore be advantageously employed in a number of reactions in place of the conventional aluminum halide catalysts. Two reactions for which the present catalysts are particularly suited are the isomerization of saturated hydrocarbons and the alkylation of isoparaffins with olefins. These processes, in order to be carried out practically, require that degradation reactions be held at an absolute minimum. The isomerization of paraffin, in particular, is ordinarily quite difficult on this account, due to the fact that most paraffin hydrocarbons, such in particular as pentane and hexane, are extremely prone to undergo degradation in the presence of aluminum halide catalysts. Although the described cyclic olefin complex catalysts are particularly advantageous for the isomerization of pentane and/or hexane, they may also be advantageously employed for the isomerization of other isomerizable saturated hydrocarbons such, for instance, as butane, heptane, octane, cyclohexane, and/or their mixtures. In many cases it is found that whereas a pure hydrocarbon such, for instance, as normal heptane may be isomerized with conventional catalysts quite practically, it is impractical to isomerize the same hydrocarbon when it is present in various mixtures of hydrocarbons, for instance a narrow heptane fraction obtained from straight run gasoline. Such mixtures of hydrocarbons are often much more prone to undergo degradation, presumably due to the presence of small amounts of materials which initiate the degradation. The cyclic olefin complex catalysts, in view of their notable selectivity, are therefore also particularly suited for the isomerization of such fractions of straight run gasoline.

The conditions of temperature, pressure, contact time, etc. required for the practical isomerization of the various isomerizable saturated hydrocarbons with aluminum halide catalysts are well known. These conditions are also generally suitable when employing the present cyclic olefin complexes. The isomerization may be effected with the hydrocarbons in either the vapor phase, liquid phase or mixed phase. In the vapor phase process the hydrocarbon vapors may be contacted with the liquid catalyst in any one of several known and conventional manners such, for instance, as by passing the vapors up through a body of the liquid catalyst. The catalyst may be stirred or may flow countercurrent to the hydrocarbon vapors, if desired, over a filling or packing material such as pumice or the like. When isomerizing hydrocarbons other than butane the process is preferably executed in the liquid phase. In the liquid phase process the hydrocarbon and liquid catalyst may be contacted batchwise or continuously in a suitable known manner. In the liquid phase process the contact time and the hydrocarbon-catalyst ratio are interdependent variables. Thus, in order to effect the reaction with a minimum practical contact time, it is preferable to employ a relatively large ratio of catalyst to hydrocarbon in the reaction zone. Thus, for example, the following conditions are preferred for the liquid phase isomerization of liquid paraffin hydrocarbons such as pentane, hexane, heptane, and saturated petroleum fractions of about the equivalent boiling range.

| | |
|---|---|
| Hydrogen halide promoter | 0.25%–15% |
| Phase ratio, catalyst/hydrocarbon | 0.1–2 |
| Temperature | 35° C.–120° C. |
| Pressure | 1–20 atm. |
| Contact time | 3–40 min. |

The present cyclic olefin catalysts, although particularly suitable for carrying out isomerization reactions, are by no means restricted to this application. They may also be advantageously employed in lieu of the aluminum halides per se or their complex compounds with other hydrocarbon types for effecting other reactions such as alkylation and the like. Particular alkylation reactions for which the present catalysts are well suited are, for example, the alkylation of isoparaffins with olefins and the alkylation of aromatics with olefins and/or cycloparaffins. These alkylation reactions when effected with the aid of the present catalysts are executed in the conventional manner.

The following examples are chosen from a large number of available experiments and are presented primarily to illustrate various aspects of the invention described above. For the sake of comparison, they all relate to the isomerization of a pentane fraction consisting of 10% isopentane and 90% normal pentane in the liquid phase at a temperature of 50° C. and a contact time of thirty minutes.

*Example I*

A cyclohexene-aluminum chloride complex was prepared by stirring together 502 g. cyclohexene (6.1 mols) and 272 g. AlCl₃ (2.04 mols) for 3 hours at a temperature of 85° C. The exothermic reaction took place readily with the separation of the reddish complex which was recovered by decantation. No excess aluminum chloride remained in suspension. The cyclohexene complex analyzed 50.7% b. w. AlCl₃. This corresponds to a complex having the composition AlCl₃·R₁.₅₇.

425 g. pentane were treated with 93 g. of this catalyst in the presence of 8.5 g. of added hydrogen chloride. Isomerization of normal pentane was effected in the substantial absence of degradation reactions. Thus, the hydrocarbon product analyzed about as follows:

| | Per cent |
|---|---|
| Butanes | 0 |
| Isopentane | 18 |
| N-pentane | 80 |
| Heavier than pentane | 2 |

The summation of the butanes and products heavier than pentane found in the product is a measure of the extent of degradation.

*Example II*

A cyclohexene-aluminum chloride complex was prepared in the manner described above and employed in the isomerization of pentane exactly as in Example I except that a larger phase ratio of catalyst to hydrocarbon was employed. Thus, the following materials were charged:

| | Grams |
|---|---|
| Catalyst | 252 |
| Pentane | 388 |
| Hydrogen chloride | 8.5 |

The product contained:

| | Per cent |
|---|---|
| Butanes | 0 |
| Isopentane | 22.5 |
| N-pentane | 74.8 |
| Heavier than pentane | 2.7 |

*Example III*

One hundred grams of powdered aluminum chloride were dispersed in the same (252 g.) cyclohexane-aluminum chloride complex used in the above Example II. The catalyst was then employed for the isomerization of a new 397 g. portion of the pentane under the same conditions of temperature, contact time and hydrogen chloride concentration. The product contained:

| | Per cent |
|---|---|
| Butanes | 0 |
| Isopentane | 22.6 |
| N-pentane | 74.6 |
| Heavier than pentane | 2.8 |

Examples I and II clearly illustrate the effect of the phase ratio of catalyst to hydrocarbon. Example III illustrates the use of a slurry or suspension of aluminum chloride in the cyclic olefin complex. It is seen that, although 100 g. of free aluminum chloride were dispersed in the cyclohexene complex, the activity of the catalyst remained substantially unchanged and there was no noticeable increase in the degradation reactions.

*Example IV*

An aluminum chloride-hydrocarbon complex was prepared with an open chain olefin as follows. Three mols of di-isobutylene were reacted with one mol of aluminum chloride while stirring for about 2 hours at a temperature of 105° C. The complex was formed readily by exothermic reaction and separated out as a thick red lower layer. The complex contained a small amount of free aluminum chloride and analyzed 42.2% B. W. AlCl₃.

449 g. of pentane were treated with 215 g. of this complex in the presence of 9.5 g. of added hydrogen chloride. The pentane used in this experiment contained 98% normal pentane and only 2% isopentane. The product contained:

| | Per cent |
|---|---|
| Butanes | 31 |
| Isopentane | 27 |
| N-pentane | 25 |
| Heavier than pentane | 17 |

*Example V*

An aluminum chloride complex was prepared as described in Example IV by reacting one mol of aluminum chloride with 3.92 mols of a branched chain octene obtained by the interpolymerization of normal butylene and isobutylene. The complex contained 44.7% B. W. AlCl₃. 398 g. of pentane were treated with 240 g. of this complex in the presence of 8 g. of added hydrogen chloride. The product contained:

| | Per cent |
|---|---|
| Butanes | 28 |
| Isopentane | 29 |
| N-pentane | 27 |
| Heavier than pentane | 16 |

Example VI

An aluminum chloride complex was prepared with toluene as follows: 1.85 mols of aluminum chloride were mixed with 5.57 mols of toluene and the mixture was stirred for 5 hours at 100° C. No complex appeared to form. The mixture was then stirred an additional 7 hours at a temperature of 90° C. while bubbling a slow stream of hydrogen chloride therethrough. All of the aluminum chloride reacted to give an oily red liquid complex. This complex contained some free toluene which was removed by washing the complex with pentane.

441 g. of pentane were treated with 235 g. of this complex in the presence of 8 g. of added hydrogen chloride. The product contained:

| | Per cent |
|---|---|
| Butanes | 0 |
| Isopentane | 7 |
| N-Pentane | 90 |
| Heavier than pentane | 3 |

Example VII

An aluminum chloride complex was prepared by reacting 0.92 mols of aluminum chloride with 2.75 mols of methyl naphthalene (B. P. 237.7° C.–241.7° C.) for 2.5 hours at 97° C. and then an additional 6 hours at 97° C. while bubbling a slow stream of hydrogen chloride therethrough. A very viscous complex containing 23.4% B. W. of AlCl₃ was formed.

440 g. of pentane were treated with 209 g. of this complex in the presence of 8 g. of added hydrogen chloride. The product contained:

| | Per cent |
|---|---|
| Butanes | 0 |
| Isopentane | 11 |
| N-pentane | 87 |
| Heavier than pentane | 2 |

Example VIII

An aluminum chloride complex was prepared by reacting 314 g. of aluminum chloride with 2833 g. of smokeless kerosene while stirring for 15 hours at 120° C. A black viscous complex formed and separated as a lower layer.

434 g. of pentane were treated with 264 g. of this complex in the presence of 9.5 g. of added hydrogen chloride. The product contained:

| | Per cent |
|---|---|
| Butanes | 14 |
| Isopentane | 58 |
| N-pentane | 15 |
| Heavier than pentane | 13 |

The above Examples IV to VIII illustrate the results obtained with various other types of aluminum chloride complexes under comparable conditions. It will be seen that the complexes formed by the open chain olefins and smokeless kerosene (Examples IV, V and VIII) cause reaction to take place but the reaction is largely one of degradation. As shown by Examples VI and VII, the aromatic complexes are of a lower order of activity and do not produce any appreciable reaction at the temperature employed. The superiority of the present cyclic olefin complexes over those produced with other hydrocarbon types will be readily apparent from the following table in which the total degradation product and isopentane contents of the products of the above examples are tabulated.

| Example | Complex | Degradation products | Isopentane |
|---|---|---|---|
| | | Per cent | Per cent |
| I | Cyclohexene | 2.0 | 18.0 |
| II | Cyclohexene | 2.7 | 22.5 |
| III | Cyclohexene+AlCl₃ | 2.8 | 22.6 |
| IV | Di-isobutylene | 48.0 | 27.0 |
| V | Octene | 44.0 | 29.0 |
| VI | Toluene | 3.0 | 7.0 |
| VII | Methyl naphthalene | 2.0 | 11.0 |
| VIII | Smokeless kerosene | 27.0 | 58.0 |

We claim as our invention:

1. A liquid catalyst of the Friedel-Crafts type consisting essentially of a liquid complex formed by the interaction of a cyclic olefin and an aluminum halide.

2. A liquid catalyst of the Friedel-Crafts type consisting essentially of a liquid complex formed by the interaction of a cyclohexene and aluminum chloride.

3. A liquid catalyst of the Friedel-Crafts type consisting essentially of a liquid complex formed by the interaction of a cyclic olefin and an aluminum halide in which is dispersed particles of an aluminum halide.

4. A liquid catalyst of the Friedel-Crafts type consisting essentially of a liquid complex formed by the interaction of a cyclic olefin and aluminum chloride in which is dispersed particles of aluminum chloride.

5. A liquid catalyst of the Friedel-Crafts type consisting essentially of a liquid complex formed by the interaction of a cylclohexene and aluminum chloride in which is dispersed particles of aluminum chloride.

6. In a process for effecting a catalytic conversion with the aid of a catalyst of the Friedel-Crafts type, the improvement which comprises contacting the reactants under reaction conditions with a catalyst consisting essentially of a liquid complex formed by the interaction of a cyclic olefin and an aluminum halide in which is dispersed particles of an aluminum halide.

7. In a process for the isomerization of an isomerizable saturated hydrocarbon, the improvement which comprises contacting the isomerizable saturated hydrocarbon under isomerizing conditions in the presence of a hydrogen halide promoter with a catalyst consisting essentially of a liquid complex formed by the interaction of a cyclic olefin and an aluminum halide.

8. In a process for the isomerization of an isomerizable saturated hydrocarbon, the improvement which comprises contacting the isomerizable saturated hydrocarbon under isomerizing conditions in the presence of a hydrogen chloride promoter with a catalyst consisting essentially of a liquid complex formed by the interaction of a cyclohexene and aluminum chloride.

9. In a process for the isomerization of an isomerizable saturated aliphatic hydrocarbon, the improvement which comprises contacting the isomerizable saturated hydrocarbon under isomerizing conditions in the presence of a hydrogen halide promoter with a catalyst consisting essentially of a liquid complex formed by the interaction of a cyclic olefin and an aluminum halide in which is dispersed particles of an aluminum halide.

10. In a process for the isomerization of an isomerizable saturated aliphatic hydrocarbon, the improvement which comprises contacting the isomerizable saturated hydrocarbon under isomerizing conditions in the presence of a hydrogen chloride promoter with a catalyst consisting essentially of a liquid complex formed by the interaction of a cyclic olefin and aluminum chloride in which is dispersed particles of aluminum chloride.

11. In a process for the isomerization of an isomerizable saturated aliphatic hydrocarbon, the improvement which comprises contacting the isomerizable saturated hydrocarbon under isomerizing conditions in the presence of a hydrogen halide promoter with a catalyst consisting essentially of a liquid complex formed by the interaction of a cyclohexene and an aluminum halide in which is dispersed particles of an aluminum halide.

12. A process for the isomerization of a substantially saturated straight run gasoline fraction boiling within the gasoline boiling range which comprises contacting said fraction in the liquid phase in the presence of a hydrogen halide promoter and at a temperature between about 35° C. and 120° C. with a preformed liquid catalyst consisting essentially of a liquid complex formed by the interaction of a cyclic olefin and an aluminum halide in which is dispersed particles of an aluminum halide.

13. In a process for the alkylation of a parffin hydrocarbon having at least 4 carbon atoms with an olefin, the improvement which comprises contacting the paraffin hydrocarbon and olefin to be alkylated under alkylating conditions with a preformed liquid catalyst consisting essentially of a liquid complex formed by the interaction of a cyclic olefin and an aluminum halide.

14. In a process for the alkylation of a paraffin hydrocarbon having at least 4 carbon atoms with an olefin, the improvement which comprises contacting the paraffin hydrocarbon and olefin to be alkylated under alkylating conditions with a preformed liquid catalyst consisting essentially of a liquid complex formed by the interaction of a cyclohexene and aluminum chloride.

15. In a process for the alkylation of a paraffin hydrocarbon having at least 4 carbon atoms with an olefin, the improvement which comprises contacting the paraffin hydrocarbon and olefin to be alkylated under alkylating conditions with a preformed liquid catalyst consisting essentially of a liquid complex formed by the interaction of a cyclic olefin and an aluminum halide in which is dispersed particles of an aluminum halide.

16. In a process for the alkylation of a paraffin hydrocarbon having at least 4 carbon atoms with an olefin, the improvement which comprises contacting the paraffin hydrocarbon and olefin to be alkylated under alkylating conditions with a preformed liquid catalyst consisting essentially of a liquid complex formed by the interaction of a cyclic olefin and aluminum chloride in which is dispersed particles of aluminum chloride.

17. In a process for the alkylation of a paraffin hydrocarbon having at least 4 carbon atoms with an olefin, the improvement which comprises contacting the paraffin hydrocarbon and olefin to be alkylated under alkylating conditions with a preformed liquid catalyst consisting essentially of a liquid complex formed by the interaction of a cyclohexene and an aluminum halide in which is dispersed particles of an aluminum halide.

CHESTER C. CRAWFORD.
WILLIAM E. ROSS.